Oct. 17, 1972 D. R. GRASSETTI ET AL 3,698,866
SPECTROPHOTOMETRIC METHOD AND REAGENTS FOR QUANTITATIVE DETERMINATION OF THIOLS
Original Filed July 31, 1969
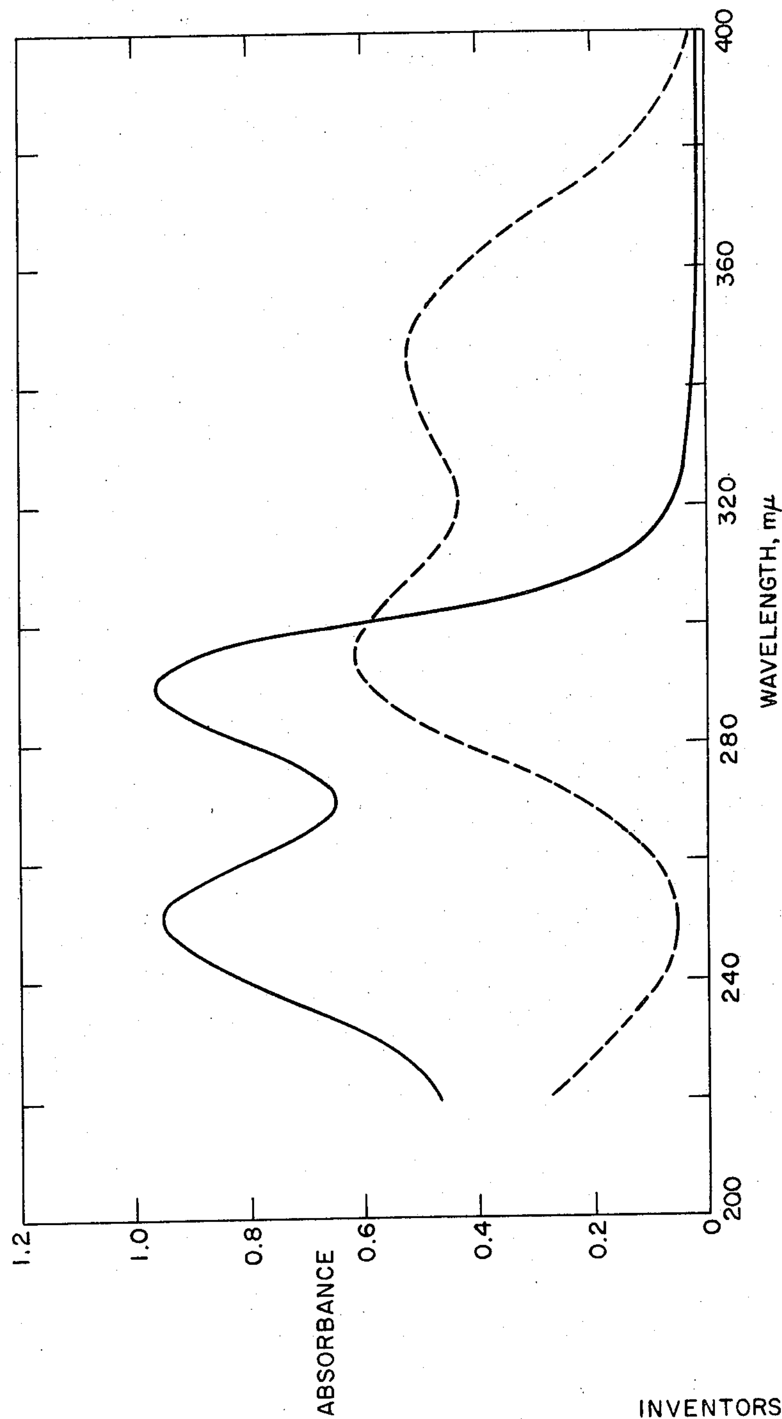
INVENTORS
DAVIDE R. GRASSETTI
JOHN F. MURRAY JR.
BY Henry Gifford Hardy.
ATTORNEY

United States Patent Office 3,698,866

Patented Oct. 17, 1972

1

3,698,866

SPECTROPHOTOMETRIC METHOD AND REAGENTS FOR QUANTITATIVE DETERMINATION OF THIOLS

Davide R. Grassetti, Berkeley, and John F. Murray, Jr., San Lorenzo, Calif., assignors to Arequipa Foundation, San Francisco, Calif.

Application July 31, 1969, Ser. No. 850,686, which is a continuation-in-part of abandoned application Ser No. 777,005, Nov. 19, 1968. Divided and this application May 24, 1971, Ser. No. 146,556

Int. Cl. C07d *51/36;* G01n *21/06, 21/20*

U.S. Cl. 23—230 R 8 Claims

ABSTRACT OF THE DISCLOSURE

A method for the quantitative determination of thiol presence in a sample which includes mixing the sample with a dithiobisheterocyclic reagent, such as 6,6′-dithiodinicotinic acid, 2,2′-dithiodiquinoline or 2,2′-dithiobis-(6-methylpyrimidine). The resulting thione derivative is detected by ultraviolet spectroscopy.

CROSS REFERENCES TO RELATED APPLICATIONS

This is a division of application S.N. 850,686 filed July 31, 1969, now abandoned, which is continuation-in-part of application S.N. 777,005, filed November 19, 1968, now abandoned. A related application is Ser. No. 812,839 filed Apr. 2, 1969, now Pat. No. 3,597,160 which is specific to a colorimetric test for sulfhydryl groups based on the use of 2,2′-dithiobis-(5-nitropyridine).

BACKGROUND OF THE INVENTION

Reagent chemicals heretofore proposed for the analysis of thiols using the ultraviolet method of analysis have been deficient in a variety of particulars. For example, the reagent chemical most commonly employed for this purpose, 5,5′-dithiobis-(2-nitrobenzoic acid), must be used in an aqueous medium of alkaline pH. It is an object of this invention to provide reagents which variously overcome one or more of these and other deficiencies encountered in using reagent chemicals of the type heretofore proposed in thiol analyses.

SUMMARY OF THE INVENTION

It has been discovered that extremely accurate quantitative analytical determinations of the sulfhydryl group content of both simple thiols as well as of complex proteinaceous and other thiols can be made by the ultraviolet method of analysis using a dithiobisheterocyclic reagent chemical, one molecule of which is capable of being converted to two molecules of a thione product. In making such determinations, the ultraviolet spectrum of the reagent chemical is compared with that manifested by the thione product formed from the reagent during the reaction with thiol. Said reagent chemicals, the spectra of which are markedly different from that of their thione products, have the formula

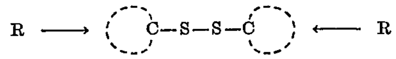

(I)

2 wherein the R's are the same and each represents a heterocyclic (aromatic) radical containing from 1 to 3 ring nitrogen atoms and optionally sulfur in the ring, said radicals being substituted or unsubstituted except in the case of the pyridyl radical in which case R is substituted pyridyl radical. Representative substituent groups which may be attached to the R groups, which may be single or fused aromatic rings, in addition to hydrogen include oxo, $C_1$–$C_6$ alkyl, $C_1$–$C_6$ alkoxy and thioalkoxy, chloro, bromo, hydroxy, acetamido, nitro, nitroso, amino, sulfo, carboxyl, or the nitrile, salt, ester or amide derivatives of said carboxyl groups. For convenience of description, compounds corresponding to Formula I above are referred to herein as "dithiobisheterocyclic" compounds or simply as "reagent" compounds.

The reaction which takes place between the heterocyclic disulfide reagent chemical and a thiol present in the sample under test can be illustrated by the following equation, wherein 6,6′-dithiodinicotinic acid is shown reacting with cysteine to produce 6-thiononicotinic acid and cystine:

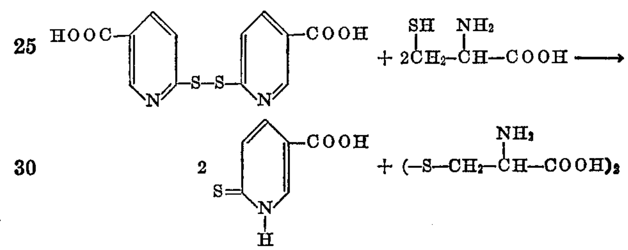

Dithiobisheterocyclic compounds corresponding to the above formula can readily be prepared by the oxidation of the corresponding precursor compounds wherein the aromatic radical indicated by R, in addition to any other substituent groups which may be present, carries a sulfhydryl group (—SH) attached to a ring carbon atom which is in either a 2- or a 4-position with reference to a nitrogen atom in said ring. In the ensuing oxidation reaction, two molecules of the starting compound link up through the sulfur atoms of the sulfhydryl groups. Conversely, in reacting with a thiol compound the molecule divides between these linking sulfur atoms and the latter become doubly bonded to the carbon atom as illustrated in the foregoing equation. This oxidation of the thiol precursor compound to form the dithiobisheterocyclic reagents hereof is readily carried out using the stoichiometrically required amount of hydrogen peroxide or a slight excess, the reaction being conducted at temperatures below about 35° C. in either an aqueous medium or in a solvent such as benzene or acetone in which the said precursor compound is soluble. Alternatively, the oxidation can be effected by the addition of iodine to a solution of the said thiol precursor in an appropriate aqueous or other solvent medium in the presence of sodium iodide or potassium iodide. The iodine can be added either per se or in the form of a solution in aqueous potassium iodide, for example, the reaction being considered complete when the iodine color persists in the stirred solution. The desired reagent product compound can be recovered and purified by conventional methods, the usual practice being to extract the compound from an aqueous reaction product mixture with benzene or other solvent, followed by washing of the extract with water and finally by evaporation of the solvent to recover the desired heterocyclic disulfide in the form of a solid.

Representative dithiobisheterocyclic compounds which can be employed to react with the thiol compound undergoing quantitative analysis in accordance with the method of this invention include:

4,4′-dithiodinicotinic acid,
6,6′-dithiodinicotinic acid,
2,2′-dithiodinicotinic acid,
2,2′-dithiobis-(isonicotinic acid),
6,6′-dithiodipicolinic acid,
4,4′-dithiodipicolinic acid,
2,2′-dithiobis-(5-aminopyridine),
2,2′-dithiodipyridine-di-N-oxide,
6,6′-dithiodinicotinic acid ethyl ester,
4,4′-dithiodinicotinic acid isopropyl ester,
6,6′-dithiodinicotinic acid methyl ester,
2,2′-dithiodinicotinic acid methyl ester,
6,6′-dithiodinicotinic acid n-butyl ester,
6,6′-dithiodinicotinic acid n-hexyl ester,
4,4′-dithiodinicotinic acid sodium salt,
6,6′-dithiodinicotinic acid sodium salt,
2,2′-dithiodinicotinic acid sodium salt,
6,6′-dithiodinicotinic acid potassium salt,
6,6′-dithiodinicotinic acid magnesium salt,
6,6′-dithiodinicotinic acid ammonium salt,
6,6′-dithiobis-(4-methylnicotinic acid)
6,6′-dithiobis-(4-n-hexylnicotinic acid),
6,6′-dithiodinicotinamide,
2,2′-dithiodinicotinamide,
4,4′-dithiodinicotinamide,
6,6′-dithiodipicolinamide,
4,4′-dithiodipicolinamide,
6,6′-dithiodipicolinonitrile,
4,4′-dithiodipicolinonitrile,
6,6′-dithiodinicotinonitrile,
2,2′-dithiodinicotinonitrile,
4,4′-dithiodinicotinonitrile,
6,6′-dithiobis-(isonicotinonitrile),
6,6′-dithiodipicolinic acid methyl ester,
4,4′-dithiodipicolinic acid ethyl ester,
6,6′-dithiodipicolinic acid sodium salt,
4,4′-dithiodipicolinic acid potassium salt,
2,2′-dithiodiquinoline,
2,2′-dithiobis-(4-methylthiazole),
2,2′-dithiodithiazole,
2,2′-dithiodiimidazole,
2,2′-dithiobis-(5-carboxypyrimidine),
2,2′-dithiobis-(4-pyridinesulfonic acid),
2,2′-dithiodipyrimidine,
2,2′-dithiobis-(4-methylpyrimidine),
2,2′-dithiodipyrazine,
4,4′-dithiobis-(1,2,3-triazine),
5,5′-dithiobis-(1,2,4-triazole),
2,2′-dithiobis-(4-methoxypyridine),
2,2′-dithiobis-(4-(methylthio)pyridine),
2,2′-dithiobis-(4,6-dichloropyridine),
2,2′-dithiobis-(5-acetamidopyridine),
2,2′-dithiobis-(4-pyridinol),
2,2′-dithiobis-(4-nitropyridine),
2,2′-dithiobis-(4-nitrosopyridine),
2,2′-dithiodiquinazoline,
4,4′-dithiodiquinazoline
2,2′-dithiobis-(5-ethoxyquinazoline),
2,2′-dithiodibenzimidazole,
2,2′-dithiobis-(4-hydroxybenzimidazole),
1,1′-dithiodiisoquinoline,
8,8′-dithiobis-(4-acetoxyisoquinoline),
1,1′-dithiobis-(3-methylisoquinoline),
3,3′-dithiobis-(6-methylpyridazine),
3,3′-dithiodipyridazine,
3,3′-dithiobis-(6-cyanopyridazine),
2,2′-dithiobis-(4-acetoxyimidazole),
5,5′-dithiobis-(3-carboxypyrazole),
5,5′-dithiodipyrazole,
2,2′-dithiobis-(pyrazine-di-N-oxide),
2,2′-dithiodipteridine,
2,2′-dithiodipurine, and
2,2′-dithiobis-(4-carboxypyrimidine).

As may be seen from the curves presented in the accompanying figure, the ultraviolet absorption spectrum of the reagent compound 6,6′-dithiodinicotinic acid (shown in solid line) is well differentiated from that (shown in dotted line) of its product compound 6-thiononicotinic acid, the peaks of the latter being well displaced from those of the parent compound. In this case, the peak at 344 millimicrons which characterizes the thione product is particularly significant since, at this wave length, the parent compound dipslays substantially no absorbance.

In carrying out the analytical process of this invention, an excess of a dithiobisheterocyclic reagent compound of the type described above is brought into reactive engagement with the thiol compound in a suitable solvent medium which can be water, ethanol, acetone or other polar solvent, the particular solvent chosen being one which will dissolve or otherwise bring into reactive engagement the reagent chemical and the thiol sample. In many cases the preferred method of opertion is to add the sample of the thiol or protein to a solution of heterocyclic reagent in an aqueous and/or alcoholic solution. The pH of the system can be adjusted as desired by the use of suitable phosphate or other buffering agents. The heterocyclic disulfide reagent compounds hereof can all be employed with good results at pH levels of from about 6.5–7.0 to about 8.0–8.5, and a preferred pH range is from about 7.0 to 7.5. However, many of the present reagent compounds can be employed at a lower pH without undergoing decomposition or otherwise losing their effectiveness. For example, the novel compound 6,6′-dithiodinicotinic acid to which claim is made herein, along with the other novel compounds 6,6′-dithiodinicotinamide, 2,2′-dithiodipyrimidine and 2,2′-dithiobis - (4 - carboxypyrimidine), can be used with success down to a pH of 5. The extremes of the effective pH range for any given dithiobisheterocyclic compound can readily be determined by routine experimentation working with known quantities of said compound and of a thiol test compound and comparing the resulting ultraviolet spectra at varying pH conditions with known spectra values at approximately pH 7.0–7.5.

The reaction which takes place between the dithiobisheterocyclic reagent chemical and the sulfhydryl groups of the thiol sample is a relatively rapid one which takes place at ambient or moderately elevated temperatures. Thus, in the case of simple thiols such, for example, as cysteine, methane thiol, ethane thiol, thiophenol, cysteamine, coenzyme A, reduced lipoic acid, mercaptoethanol and the like, the reaction is complete under ambient temperatures immediately upon mixing of the reactants. When working with proteins, a somewhat longer reaction time is required. Thus, a reaction interval of 2 to 10 minutes is appropriate with materials such as bovine serium albumin, while with other proteins such as the enzyme aldolase and the citrate condensing enzyme, the reaction proceeds more slowly and requires from about 2 to 4 or more hours at 25° C. Animal tissues, after a preliminary homogenization and heat-denaturing step, are frequently incubated with a disulfide reagent, as disclosed herein, for one or more hours at temperatures of 35° C. to 40° C. The progress of the reaction can in all cases be followed by the practice of ultraviolet analytical techniques with the absorption spectra being observed until their maxima reach constant values.

The actual ultraviolet absorption analytical techniques employed in a practice of this invention are similar to those which are used in employing this method for the analysis of other chemicals, and the operator is dealing with reaction product spectra which are compared with those obtained from suitable blanks, including those containing only the thiol sample and only the dithiobisheterocyclic reagent, which are carried through the procedure.

Data which characterize the ultraviolet absorption spectra of a number of dithiobisheterocyclic compounds coming within the scope of this invention as well as the derivative compounds produced therefrom are given in the following table under the caption "Useful Wavelength." The first column thereunder indicates the wavelength of the diminishing peak or shoulder to be measured in calculations based on extinction of the reagent compound, while the second column indicates the pertinent peaks to be measured in calculations based on content of the product compound which is formed. It is believed that the latter compounds are heterocyclic thiones with the possible exception of that formed from 2,2′-dithiobis-(benzimidazole), where the precise nature of the product is still undetermined.

TABLE

| Dithiobisheterocyclic reagent compound | Useful wavelength (mμ) in calculations based on— Disappearance of reagent compound | Formation of product compound |
|---|---|---|
| 2, 2′-dithiodipyridine-di-N-oxide | 234 | 244, 282, 332 |
| 6, 6′-dithiodinicotinic acid | 251 | 344 |
| 6, 6′-dithiobis-(isonicotinic acid) | 300 | 273, 365 (325–420) |
| 6, 6′-dithiodinicotinamide | 252 | 310 to 380 |
| 2, 2′-dithiobis-(5-aminopyridine) | 253, 311 | 279, 371 |
| 2, 2′-dithiodiquinoline | 230–255, 320 | 276, 384 (340–430) |
| 2, 2′-dithiodipyrimidine | 238 | 277 |
| 2, 2′-dithiobis-(4-methylpyrimidine) | 239 | 278 |
| 2, 2′-dithiobis-(4-methylthiazole) | 272 | 311 |
| 2, 2′-dithiobis-(benzimidazole) | [1] 330 | 242, 299 |
| 2, 2′-dithiobis-(5-acetamidopyridine) | 260 | 295, 372 |
| 6, 6′-dithiobis-(nicotinonitrile) | 260 | 325 |
| 2, 2′-dithiobis-(4-carboxypyrimidine) | 238 | 277 |

[1] Shoulder.

DESCRIPTION OF THE PREFERRED EMBODIMENTS

The following examples illustrate the invention in certain of its embodiments but are not to be construed as limiting:

EXAMPLE 1

Analysis of the sulfhydryl content of bovine serum albumin

The analysis was performed using a Beckman spectrophotometer model DU. The spectrophotometer cuvettes were standard silica glass of one centimeter path length. The hydrogen lamp was used in conjunction with a 1P28 photomultiplier tube.

(A) Bovine serum albumin was dissolved in a buffer consisting of 0.1 M $KH_2PO_4$ which had been neutralized to a pH of 7.5 with NaOH.

(B) A 1.50 ml. sample of bovine serum albumin from (A) above, was mixed with 1.5 ml. of a $1\times10^{-2}$ M solution of 6,6′-dithiodinicotinic acid, dissolved in the same buffer as in (A) above, directly in the spectrophotometer cuvette.

(C) After a reaction interval of approximately 3 minutes at 25° C., the absorbance at 344 mμ of the above mixture (B) was measured against a blank solution containing the same quantity of 6,6′-dithiodinicotinic acid in the same total volume of buffer (3.00 ml.) as above (B), but not containing the test sample (bovine serum albumin). The absorbance was constant after 1.5 minutes and was 0.605.

(D) The absorbance at 344 mμ of a solution of the test sample (bovine serum albumin) of the same quantity as in (B) above and in the same total volume (3.00 ml.), was measured against a blank solution of the same volume, but containing no 6,6′-dithiodinicotinic acid and no bovine serum albumin. The absorbance at 344 mμ was 0.088.

(E) 0.20 ml. aliquot of the solution of bovine serum albumin, as in (A) above, was diluted to 3.00 ml. with the same buffer as in (A). The absorbance at 280 mμ at 260 mμ of the dilution was measured against a blank solution containing only the buffer. The absorbance at 280 mμ was 0.631. The absorbance at 260 mμ was 0.378. This operation is performed to determine the exact protein content of the test sample. This is the standard method for protein determination. (Methods in Enzymology, vol. III, p. 454.)

(F) The sulfhydryl content is calculated from the following equation.

$$\frac{A_{344}\,(C)-A_{344}\,(D)}{E_{344}}\times3=\text{millimole SH/cuvette}$$

Where $A_{344}$ (C)=Absorbance at 344 mμ measured in (C) above;
$A_{344}$ (D)=Absorbance a 344 mμ measured in (D) above;
$E_{344}$=Molar extinction of 6-thiononicotinic acid and
3=Total volume of cuvette in ml.

Millimole SH/cuvette $$=\frac{0.605-0.088}{1.00\times10^4}\times3$$

$$=0.155\times10^{-3}\text{ millimole/cuvette}$$

(G) The amount of bovine serum albumin/cuvette was calculated from the data in (E) above as follows:

$$\text{Protein (mg./cuvette)}=(1.55A_{280}-0.76A_{260})\times3\times\text{dilution factor}$$

Where $A_{280}$=Absorbance at 280 mμ as measured in (E) above.
$A_{260}$=Absorbance at 260 mμ as measured in (E) above.
3=Total volume of the cuvette contents.

$$\text{Dilution factor}=\frac{\text{volume of bovine serum albumin aliquot in (B) above}}{\text{volume of bovine serum albumin aliquot in (E) above}}$$

which is=1.50/0.20=7.5

Therefore, $$\text{Protein (mg./cuvette)}=(1.55\times0.631)-(0.76\times0.378)\times3\times7.5$$

protein=15.5 mg./cuvette (B)

(H) The sulfhydryl content of bovine serum albumin is therefore $$\frac{0.155\times10^{-3}\text{ millimole SH}}{15.5\text{ mg. bovine serum albumin}}$$

or $1.00\times10^{-5}$ millimole sulfhydryl/mg. bovine serum albumin.

EXAMPLE 2

2,2′-dithiodipyrimidine 7.5 g. 2-mercaptopyrimidine hydochloride, a commercially available chemical, is dissolved in a solution composed of 8.0 g. KOH in 100 ml. water. A solution of iodine in aqueous KI is added slowly to the above solution at room temperature. The addition is continued as long as the color of the iodine is discharged. The product which precipitates out during the reaction is filtered off and subsequently recrystallized from isopropanol. There is obtained 3 g. of a product melting at 133°–136° C. which is then further purified by treatment with charcoal, followed by recrystallization from ethyl acetate-petroleum ether. The final product so obtained has a melting point of 139°–140° C. Analysis discloses the compound to be 2,2'-dithiodipyrimidine. It is found to contain 43.57 percent carbon and 2.95 percent hydrogen, versus calculated values of 43.22 percent and 2.72 percent, respectively, for these elemental components in the said compound.

EXAMPLE 3

6,6'-dithiodinicotinamide 2.0 g. of 6-chloronicotinamide and 3.0 g. of thiourea were dissolved in 15 ml. of dimethylformamide and the solution refluxed for 15 minutes. The resulting mixture was poured into 100 ml. of 2 N KOH and stirred for 15 minutes. After cooling, the mixture was acidified with acetic acid, giving 1 g. of a solid product which was filtered off and recrystallized from water. This compound, which had a melting point of 265°–267° C., was identified as 6-mercaptonicotinamide. The 6-mercaptonicotinamide so obtained was dissolved in dilute NaOH and oxidized by slow addition of a solution of iodine in aqueous KI until a persistent yellow color was observed. The product which precipitated out during the reaction was filtered off and recrystallized from isopropanol. This product which was obtained in the amount of 0.65 g., had a melting point of 263°–265° C. Analysis disclosed the compound to be 6,6'-dithiodinicotinamide. It was found to contain 46.34 percent carbon and 3.57 percent hydrogen, versus calculated values of 47.04 percent and 3.29 percent, respectively, for these elemental components in the said compound.

EXAMPLE 4

6,6'-dithiodinicotinic acid 5 g. 6-chloronicotinic acid and 15 g. of thiourea were dissolved in 40 ml. of dimethylformamide and the mixture heated to reflux for 15 minutes. The resulting mixture was poured into 250 ml. of 2 N KOH and the resulting solution was filtered and the filtrate allowed to cool. The solution was acidified with concentrated hydrochloric acid, giving 4.3 g. of a solid product which was collected by filtration. It had a melting point of 262°–268° C. and was identified as 6-mercaptonicotinic acid. The 6-mercaptonicotinic acid (1 g.) was dissolved in 500 ml. of hot water. A solution of iodine in aqueous KI was added slowly until the color of the iodine was no longer discharged. As the iodine was added, the product precipitated as a crystalline solid. It was filtered off, washed with acetone and dried, yielding a product having a melting point of 265° C. which analysis disclosed to be 6,6'-dithodinicotinic acid. It was found to contain 47.11 percent carbon and 2.82 percent hydrogen versus calculated values of 46.75 percent and 2.62 percent, respectively, for these elemental components in the said compound.

EXAMPLE 5

2,2'-dithiobis-(4-carboxypyrimidine)

In this synthesis, 2 g. of 2-mercapto-4-carboxypyrimidine (prepared by the method of Daver et al., J. Heterocyclic Chemistry, 1, 130 (1964)), are dissolved in 500 ml. of hot water and titrated with a solution of iodine in aqueous potassium iodine until a permanent color appears. The mixture is then cooled, and the solid material which is then present is filtered off and washed with cold acetone. It is repurified by dissolving the solid in dilute sodum bicarbonate solution, filtering off undissolved residue, and acidifying the filtrate with acetic acid. Again, the precipitate which forms is filtered off, washed with cold acetone and dried. The product so obtained in the amount of 1.5 g. is a buff-colored amorphous solid melting at 189° C. (with decomposition). It has low solubility in water and is sparingly soluble in acetone, benzene and other organic solvents. Elemental analysis discloses the compound to have carbon and hydrogen contents of 36.3 and 2.56 percent, respectively, as compared with theoretical values of 36.5 and 2.56 percent for these elemental components in the captioned compound. In practice, the acid can be employed in the form of its alkali metal salts, if desired, when practicing the process of this invention, though the acid, per se, can also be utilized if a dilute solution thereof is used. The alkali metal salts (e.g., the sodium salt) are readily soluble in water. As indicated above in the table, the acid exhibits a useful peak at 238 mμ, while the corresponding thione product compound has a useful peak at 277 mμ. The peaks obtained with the corresponding sodium salts have substantially the same wavelengths.

The heterocyclic thiol compounds which are oxidized to form the dithiobisheterocyclic reagent compounds of the present invention can be prepared by one or another of a variety of methods which are known to the skilled in the art. In one such method, the corresponding halo-substituted heterocyclic compound is reacted with sodium sulfide to form the desired thiol compound and sodium chloride or sodium bromide, for example, as a by-product. The reaction can be conducted by adding the haloheterocyclic compound to a refluxing slurry of the sodium sulfide in a lower alcohol solvent such as isopropanol or the like, the reactants being employed in substantially equimolar amounts. The reaction proceeds readily as the stirred reaction mixture is refluxed for ½ to 4 or more hours. The resulting product mixture is poured into water and then acidified to precipitate the desired thiol compound. The latter can be filtered off and further purified as by conventional washing and solvent recrystallization methods, if desired.

Another method which is of general utility in preparing the heterocyclic thiols is to react the corresponding halo-substituted heterocyclic compound with thiourea. This method of preparation is that detailed in Examples 3 and 4 above.

The reagent chemicals 6,6'-dithiodinicotinic acid, 6,6'-dithiodinicotinamide, 2,2'-dithiodipyrimidine and 2,2'-dithiobis-(4-carboxypyrimidine) which can be generically represented by the formula $$R^1—S—S—R^1$$

wherein the $R^1$'s are the same and are selected from the group consisting of 6-nicotinic acid, 6-nicotinamide, 2-pyrimidine and 2-(4-carboxypyrimidine) radicals, are novel compounds which have utility for the purposes described above. They also can be used as the active chemical in various pesticidal compositions.

We claim:

1. In a method for determining the content of thiol compound in a sample wherein said sample is admixed with a reagent compound which interacts with any sulfhydryl groups present to form a product compound, and wherein the ultraviolet spectrum of the resulting reaction product mixture is employed to determine the content of said product compound and thus of the thiol content of the sample, the improvement which consists in employing as the reagent compound a dithiobisheterocyclic compound having the formula

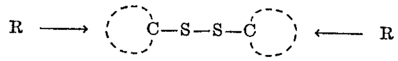

wherein the R's are the same and each represents a heterocyclic aromatic radical containing from 1 to 3 ring nitrogen atoms and optionally sulfur in the ring, said radicals not including unsubstituted pyridyl radicals.

2. A method as in claim 1 wherein the dithiobisheterocyclic reagent compound is 2,2'-dithiobis-(isonicotinic acid).

3. A method as in claim 1 wherein the dithiobisheterocyclic reagent compound is 6,6'-dithiodinicotinic acid.

4. A method as in claim 1 wherein the dithiobisheterocyclic reagent compound is 2,2'-dithiodiquinoline.

5. A method as in claim 1 wherein the dithiobisheterocyclic reagent compound is 2,2'-dithiodipyridine-di-N-oxide.

6. A method as in claim 1 wherein the dithiobisheterocyclic reagent compound is 2,2'-dithiodipyrimidine.

7. A method as in claim 1 wherein the dithiobisheterocyclic reagent compound is 2,2'-dithiobis-(4-methylpyrimidine).

8. A method as in claim 1 wherein the dithiobisheterocyclic reagent compound is 2,2'-dithiobis-(4-carboxypyrimidine).

References Cited

UNITED STATES PATENTS 3,597,160 8/1971 Grassetti ---------- 23—230 R

OTHER REFERENCES

D. R. Grassetti et al., J. Medicinel Chem., 10 (6), 1170–2 (1967).

Chem. Abs., 64: 16634f (1966).

Chem. Abs., 70: 95124a (1969).

Chem. Abs., 71: 35776a (1969).

MORRIS O. WOLK, Primary Examiner

S. MARANTZ, Assistant Examiner

U.S. Cl. X.R.

23—230 B; 252—408; 260—256.5 R, 283 S, 294.8 E, 294.8 J